Feb. 13, 1923.

Re. 15,539

T. B. DIXON

TELEGRAPHY

Original Filed May 11, 1920 5 sheets-sheet 1

INVENTOR.
Thomas B. Dixon
BY Jas. H. Griffin
ATTORNEYS.

Feb. 13, 1923.

T. B. DIXON

Re. 15,539

TELEGRAPHY

Original Filed May 11, 1920

5 sheets-sheet 2

INVENTOR.
Thomas B. Dixon
BY Jas. H. Griffin
ATTORNEYS.

Feb. 13, 1923.

Re. 15,539

T. B. DIXON

TELEGRAPHY

Original Filed May 11, 1920 5 sheets-sheet 3

INVENTOR.
Thomas B. Dixon
BY Jas. H. Griffin
ATTORNEYS.

Feb. 13, 1923.

T. B. DIXON

Re. 15,539

TELEGRAPHY

Original Filed May 11, 1920

5 sheets-sheet 4

INVENTOR.
Thomas B. Dixon
BY Jas. H. Griffin
ATTORNEYS.

Feb. 13, 1923.

Re. 15,539

T. B. DIXON

TELEGRAPHY

Original Filed May 11, 1920 5 sheets-sheet 5

INVENTOR.
Thomas B. Dixon
BY Jas. H. Griffin
ATTORNEYS.

Reissued Feb. 13, 1923.

Re. 15,539

UNITED STATES PATENT OFFICE.

THOMAS BULLITT DIXON, OF NEW YORK, N. Y.

TELEGRAPHY.

Original No. 1,339,549, dated May 11, 1920, Serial No. 804,873, filed December 5, 1913. Application for reissue filed May 3, 1922. Serial No. 558,267.

*To all whom it may concern:*

Be it known that I, THOMAS B. DIXON, a citizen of the United States of America, and a resident of New York, in the county of Queens and State of New York, have invented certain new and useful Improvements in Telegraphy, of which the following is a specification.

My invention relates to telegraph systems and apparatus, and particularly to systems and apparatus adapted for use in connection with lines of very great retardation, such as submarine cables. In the method of transmitting and receiving telegraphic signals, most commonly used on long submarine cable lines, dots and dashes of the telegraphic code are represented by current pulses of different directions, but of approximately the same duration, a positive pulse for example, indicating a dot, and a negative pulse, a dash. The signals are received by an instrument, termed a "siphon recorder" which is in its nature a very sensitive galvanometer the moving member of which is provided with a pen (this pen being, in practice, a siphon tube) which traces a wavy line on a moving record strip, waves to one side of an imaginary center on such strip designating dots and waves to the other side of such imaginary center designating dashes. At low speed, the signals thus transmitted and received come out clearly; but as the speed of transmission rises, the signals become indistinct, until, at what would be a very moderate speed for transmission over a land line, the signals become so indistinct as to be unintelligible.

My present invention comprises means for amplifying telegraphic signals, particularly signals transmitted as described through circuits of very great retardation, whereby distinct signals are produced at speeds of transmission at which signals, if received in the ordinary way, would be unintelligible; and by the means for amplifying signals, herein described, I have been able to reach a speed of transmission very much greater than any practicable speed of transmission heretofore possible over the same or corresponding lines.

My invention also consists in a method of amplifying telegraphic signals transmitted through circuits of great retardation, such method comprising causing the current wave in such circuit to vary the action of radiant energy on radio-electro-sensitive means, and causing such radio-electro-sensitive means to produce variations in current flow in a circuit comprising signal-receiving means. Thus, my invention comprises, as an apparatus, signal-amplifying means comprising radiant-energy-varying means adapted to be influenced by the current waves of the transmission circuit and adapted to vary the action of radiant energy on radio-electro-sensitive means, together with signal receiving means in a circuit influenced by such radio-electro-sensitive means.

As above stated, the receiving instrument commonly used is in its nature a galvanometer which constitutes the primary receiving instrument. The currents which operate this galvanometer are so exceedingly feeble that I have not found it practicable, in practice, to amplify such signals materially by mechanical means; for mechanical means for amplification of signals necessarily involves moving parts which have inertia, the effect of inertia being to so dampen the signals as to defeat the desired object. According to my present invention, I substitute a reflector, or other means for directing and deflecting a beam of radiant energy (usually a light beam), for the pen or siphon tube of the recorder, and cause this beam of radiant energy to act variably on radio-electro-sensitive means (customarily one or more selenium cells). The light beam deflected by the mirror of the galvanometer constitutes in effect a pointer of any desired length, but which is entirely without inertia. Therefore the length of the light beam may be varied as desired or required, thereby effecting movement of the pointer through any desired range, without increasing the inertia of the movable galvanometer member.

As is well known, selenium is a substance the electrical resistance of which varies greatly according as it be in light or in darkness. In darkness selenium has very high electric resistance, but when brightly illuminated the resistance of the selenium falls very greatly. Other substances have similar properties. Actinium for example has a relatively low resistance in darkness and a relatively high resistance when brightly illuminated. And my radio-electro-sensitive element is not necessarily either a selenium cell or an actinium cell; for a thermal couple such as is commonly contained in a thermopile will generate current variably if acted upon variably by heat rays. I prefer, however, to use selenium cells as the radio-electro-sensitive elements employed according to my invention, as in practice I have found them very reliable, and I so locate one or more of these cells that the beam of light, variably deflected by the galvanometer reflector, as previously described, will move across the face or faces of such cell or cells. I connect such cell or cells to an electric circuit or circuits containing a source or sources of electric energy, for example, a primary battery, and the variation of resistance of the selenium cell or cells, due to the variable illumination of such cell or cells, causes variation in current flow through such circuit or circuits, capable of actuating the moving element of a galvanometer or like instrument. The secondary receiving instrument employed by me in the circuit of such selenium cell or cells is commonly an ordinary siphon recorder; the amplification of the signals of the cable circuit, due to the variable deflection of a beam of light by a reflector, actuated by such signals, over the surface or surfaces of a selenium cell or cells themselves in the circuit of the siphon recorder, being so great that intelligible and very clear signals are produced at speeds far above the speeds at which intelligible signals would be produced if the siphon recorder were in the cable circuit itself according to former practice. I have not found that, by so amplifying the signals of the cable, objectionable pecularities are impressed upon such signals by the amplifying apparatus. To the contrary, the signals remain of the same character as before, except that their quality is improved, but the deflections of the movable member of the siphon recorder are so very much greater than they would be if that siphon recorder were directly in the cable circuit, that intelligible and very clear signals are produced at speeds of transmission far above what has been practicable heretofore on similar circuits.

My invention also comprises a pair of selenium cells or other radio-electro-sensitive devices, or a plurality of pairs of cells or devices, together with means for varying the action of radiant energy in opposite senses simultaneously upon the two cells of such pair or of each such pair, together with signal receiving means, and circuit means as hereinafter described, whereby as the action of radiant energy is decreased upon one cell of such a pair and is correspondingly increased upon the other cell of such pair, the two cells cooperate to produce cumulative or additive effect on such signal receiving device.

The object of my invention is to increase the speed and certainty of transmission of signals through electric circuits, particularly circuits of high retardation.

The accompanying drawings illustrate diagrammatically the means for amplification of telegraph signals, herein described. In said drawings:

Figure 1 shows diagrammatically an arrangement of transmitting, signal-amplifying, signal-receiving and signal repeating means embodying my invention.

Figure 1[a] is a detail diagram showing the transmitting circuits of repeating relays 27 and 28 of Fig. 1.

Fig. 4 also illustrating the light beam and means for producing it, the line galvanometer and the coil and magnets of the receiving siphon recorder.

Figure 1:
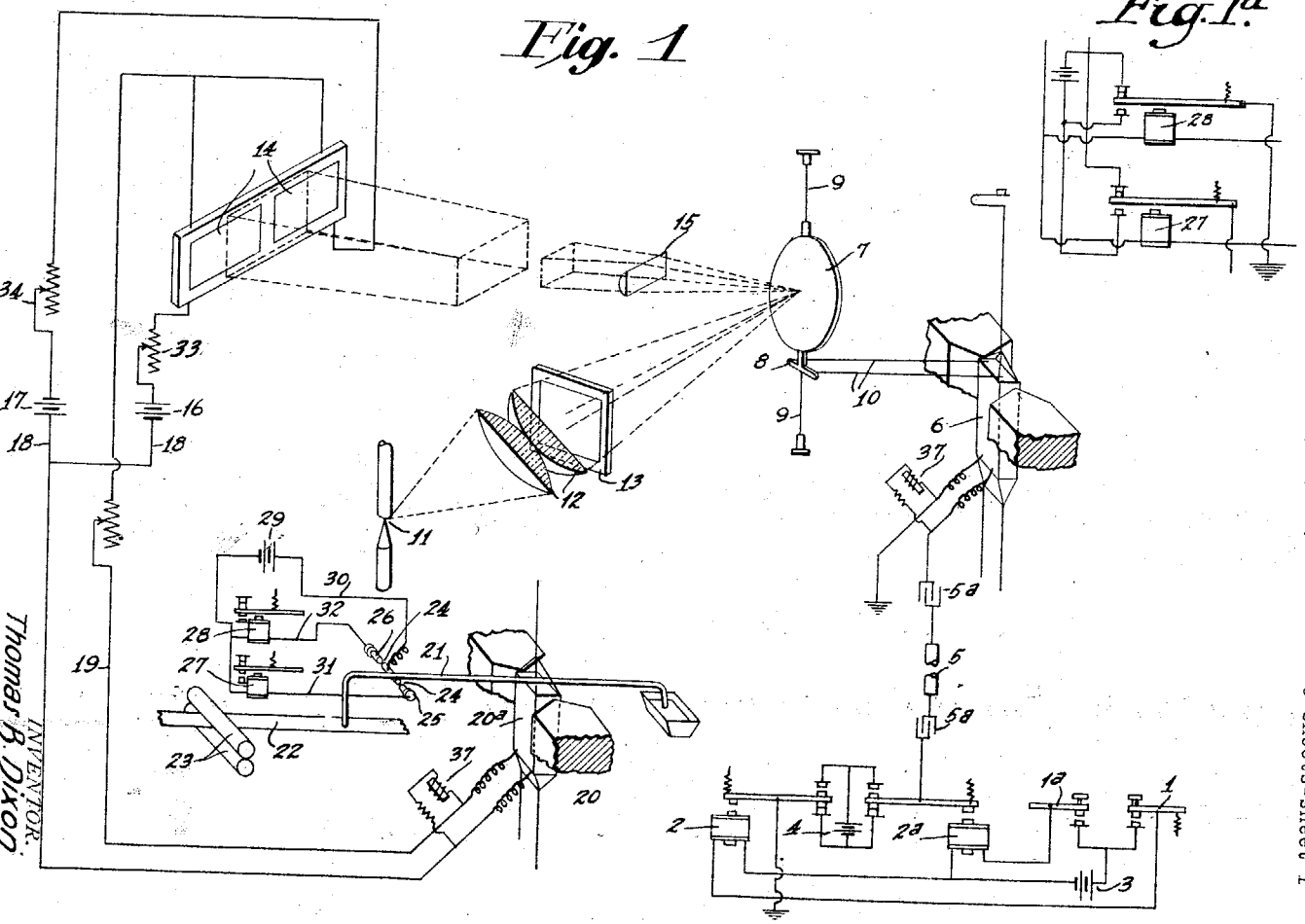

Referring first to Fig. 1 numerals 1 and 1ª designate two telegraphic keys (shown in this case, as keys designated to be operated by hand) which operate corresponding transmitting relays 2, 2ª by closing and breaking branch circuits of battery 3. The key 1, when depressed, will close circuit from this battery to the relay 2, and the key 1ª, when depressed, will close circuit to the relay 2ª. The operation of either of these relays places a transmitting battery 4 in circuit to send current into the cable 5, which cable, as shown, connected for working in one direction, is provided with the usual block condensers 5ª at its two ends. The currents sent into the cable will have a polarity of positive to line and negative to earth when the relay 2ª is operated, and a polarity of positive to earth and negative to line when the left hand relay 2 is operated. At the receiving end of the cable there is a galvanometer comprising a suspended coil 6, located in a magnetic field, and in a circuit extending from the cable, through the corresponding condenser 5ª, to ground. The receiving galvanometer further comprises a mirror 7 suspended by suspension fibers 9 to swing freely, and provided at its lower end end with a T-shaped piece 8 connected to coil 6 by two delicate fibers 10; the points of connection of these fibers 10 to the piece 8 being, preferably, closer together than the points of connection of said fibers to the coil 6, so that for any given angular movement of the coil 6, the angular movement of the mirror 7 is greater. A suitable source of light, 11, is provided (the particular source diagrammatically indicated being the carbons of an electric arc lamp) and the light beam from such source passes through suitable lenses 12 and a screen 13 to the reflector 7, and thence is reflected variably to selenium cells hereinafter mentioned. The beam of light from the source 11 is shaped by condensing lenses 12 and the screen 13 so that its cross section, at the point where it strikes the selenium cells 14, would be approximately square but for the fact that it passes through a plano-cylindrical lens 15 which condenses it in one direction (i. e., condenses it vertically with the lens 15 positioned as shown in the drawing.) The beam of light is therefore approximately rectangular where it strikes upon the selenium cells. The selenium cells 14 have their terminals connected with batteries 16 and 17 in circuit branches 18 of a circuit 19 connected to the coil 20ª of a siphon recorder 20; which recorder is itself a specific form of galvanometer. When the light beam is in central position with respect to the two selenium cells, as indicated in the drawing, then, assuming the batteries 16 and 17 to be equal, and the resistances in the circuit branches 18 (such resistances including the resistances of the selenium cells themselves) to be equal when the two cells 14 are equally illuminated, the two batteries 16 and 17 oppose each other in the circuit 19 and no current will flow through the coil 20ª of the siphon recorder. When, however, the light beam is deflected from its central or zero position, indicated, to one side or the other (for example, when the light beam is deflected from left to right, such deflection corresponding it may be assumed, to a dot signal transmitted through the cable 5) current from battery 17 will predominate and flow through circuit 19 and coil 20ª of the siphon recorder, thus causing movement of the siphon tube or pen 21. If the deflection of the light beam is from right to left (such deflection corresponding to a "dash" signal) the current of battery 16 will predominate. I have indicated that, as is usual in siphon recorders, the siphon tube trails over a strip of moving tape 22, moved forward continuously by suitable feeding means 23. The siphon tube therefore traces a line along the tape 22 as the latter moves, which line is deflected to one side or the other when the coil 20ª of the recorder is deflected to one side or the other.

My signal amplifying device may also be used as a repeater; to this end the coil 20ª may operate a contact point 24 (shown in the drawing as mounted on the siphon tube 21 itself) which contact point 24 plays between contact stops 25 and 26 in circuit, respectively, with repeating relays 27 and 28 in circuit with a battery 29, one side of this battery being connected by a conductor 30 to contact point 24, and the other side of this battery being connected, by conductor 31, and through repeating relay 27, to contact stop 25, and being also connected by a conductor 32, through repeating relay 28, to contact stop 26.

When the coil 6 of the receiving galvanometer is in central position, and, therefore, when the light beam playing upon the selenium cells is in zero position, one half of each of the selenium cells 14 is illuminated, the other half of each such cell being unilluminated. The resistances of the two selenium cells should then be equal; but since it is difficult to obtain two selenium cells of exactly the same resistance, I have indicated in the drawing adjusting variable resistances 33 and 34, whereby the resistance of the two circuit branches 18 may be made equal.

The operation of the system is as follows:

Supposing the transmitting key 1 to be depressed, then the negative pole of battery 4 is connected to the cable through the contacts of the relay 2ª, and the positive pole of battery 4 is connected to ground through the contacts of the relay 2; and a current wave is transmitted through the cable 5, causing deflection of coil 6 of the receiving galvanometer (and it may be assumed that such deflection is to the right), which in turn causes the beam of light playing on the selenium cells 14 to move to the right, decreasing the illumination of the left hand cell 14 and increasing the illumination of the right hand cell 14, and so increasing the resistance in the circuit branch 18 containing battery 16, and decreasing the resistance in the circuit branch 18 containing battery 17, thereby disturbing the balance theretofore existing between these two branch circuits and causing flow of current through circuit 19 which, in turn, causes deflection of coil $20^a$, moving the tracing end of siphon tube 21 (and it may be assumed that such motion is to the right). Similarly, depression of key $1^a$ will cause movement of the siphon tube 21 to the left.

Figure 2:
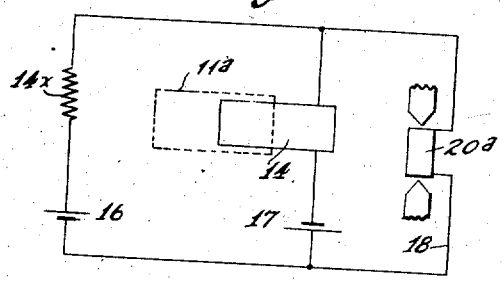
Figure 2 is a diagram illustrating the use of one radio-electro-sensitive element in lieu of the two radio-electro-sensitive elements employed in Fig. 1 and further illustrates the fact that in the arrangement shown in Fig. 1 each radio-electro-sensitive element 14 acts, in a measure, independent of the other.

While the two selenium cells 14, in the arrangement just described, cooperate to produce, by their varying resistance, deflections of coil $20^a$, they also operate independently in a sense; as is indicated by Fig. 2, wherein only one of these cells 14 is shown, the other cell 14 being replaced by a balancing resistance $14^x$; circuit arrangements being otherwise similar, the beam of light being indicated by a dotted rectangle $11^a$. It will be seen that while, with the beam of light in the position shown, and the resistance $14^x$ adjusted to exactly balance the resistance of the selenium cell 14 so illuminated, the batteries 16 and 17 neutralize each other respectively in the circuit 18, yet if that beam of light be moved, the consequently varied resistance of cell 14 will cause a current from the one battery or the other to pass through circuit 18 and deflect the coil $20^a$.

Figure 3:
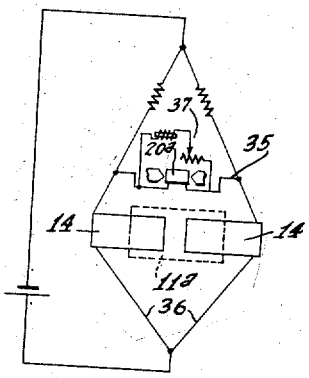
Figure 3 shows an alternative arrangement of circuits for use when a plurality of radio-electro-sensitive elements are employed, such elements being located in a Wheatstone bridge.

Various arrangements of circuits including the selenium cells and the coil $20^a$ may be used. In Fig. 3, I indicate a Wheatstone bridge arrangement wherein the two selenium cells 14 are each in one arm of the bridge, the coil $20^a$ being in the cross wire 35 of the bridge, the latter being designated generally by the number 36.

Figure 4:
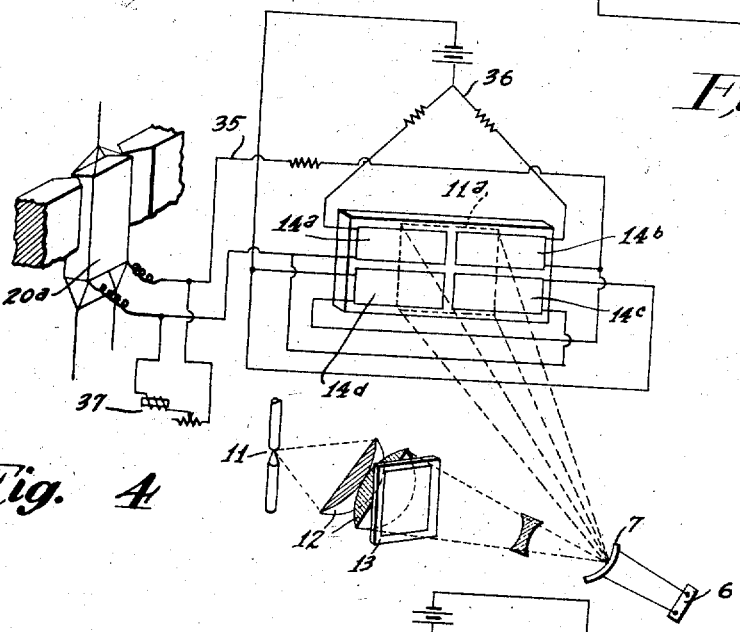
Figure 4 is a diagram somewhat similar to Fig. 3, but indicating connections which may be employed when four radio-electro-sensitive elements are employed in a Wheatstone bridge circuit.

Instead of employing one cell only, or two cells only, a larger number of selenium cells may be employed. In Fig. 4 I show one means for employing four selenium cells designated respectively by reference characters $14^a$, $14^b$, $14^c$ and $14^d$. The circuits are those of a Wheatstone bridge 36, as will be more apparent from Fig. 5, wherein the circuits are shown in conventional Wheatstone bridge arrangement, without regard to the relative physical positions of the various selenium cells; the coil $20^a$ being in the cross wire 35 of the bridge. The principle of the Wheatstone bridge being well known, it will be apparent that if movement of the beam of light $11^a$ increases the illumination of selenium cells $14^a$ and $14^d$ and decreases the illumination of cells $14^b$ and $14^c$, there will be a flow of current in one direction through the cross wire 35 of the bridge, producing a deflection of coil $20^a$; while if the change in illumination of the selenium cells be in the opposite sense, there will be a flow of current through the cross wire 35 in the opposite direction.

Figure 5:
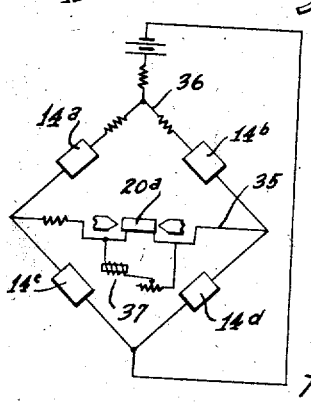
Figure 5 is a diagram illustrating, in conventional Wheatstone bridge arrangement, the location of the several radio-electro-sensitive elements in the arms of the Wheatstone bridge of Fig. 4.
Figure 8:
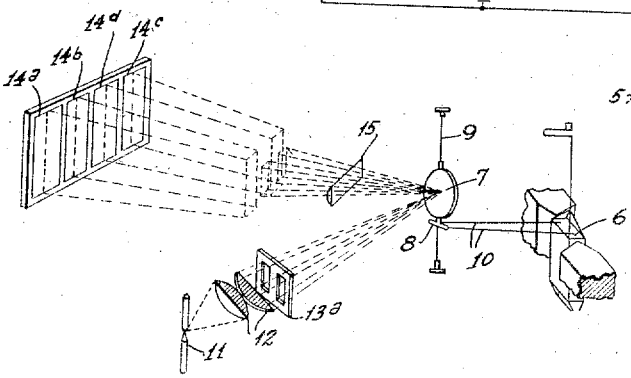
Figure 8 is a diagram, similar to Fig. 4, illustrating another arrangement whereby four radio-electro-sensitive elements may be employed in cooperative relation.

In the alternative arrangement shown in Fig. 8, the screen which shapes the light beam, which screen is in this figure designated by numeral $13^a$, is provided with two apertures, dividing the light beam into two separate beams both of which are directed upon and are reflected by the same mirror 7, and passing through the plano-cylindrical lens 15 impinge, one upon radio-electro-sensitive elements $14^a$ and $14^b$, the other upon radio-electro-sensitive elements $14^d$ and $14^c$. The two beams move together and as the illumination of elements $14^a$ and $14^d$ is increased, the illumination of elements $14^b$ and $14^c$ is decreased; and vice versa. These cells are preferably employed in a Wheatstone bridge, as illustrated in Fig. 5. The arrangement shown in Figure 8 is desirable when, as result of adjustment for high speed operation, the coil 6 of line galvanometer has a relatively small amplitude of movement.

I have found that the sharpness of definition of the signals, and the permissible speed of transmission, are greatly increased by the provision, in connection with the coil 6 of the receiving galvanometer, and also in connection with the coil $20^a$ of the siphon recorder, of a "magnetic shunt" 37, (see Fig. 1) i. e., a resistance of high inductive value such as is commonly used in connection with siphon recorders in cable systems; such shunted inductive resistances having, as is well known, the effect of "squaring the signals". And sometimes, as indicated particularly in Fig. 11, I employ, in connection with one or another of these magnetic shunts, a shunted condenser 38. By proper adjustment of resistance and inductance of the magnetic shunt or shunts 37, and by proper adjustment of the reactance of the shunted condenser 38, I can so "time" or "tune" the circuits as to produce conditions most desirable for the reception of telegraphic signals.

Figure 6:
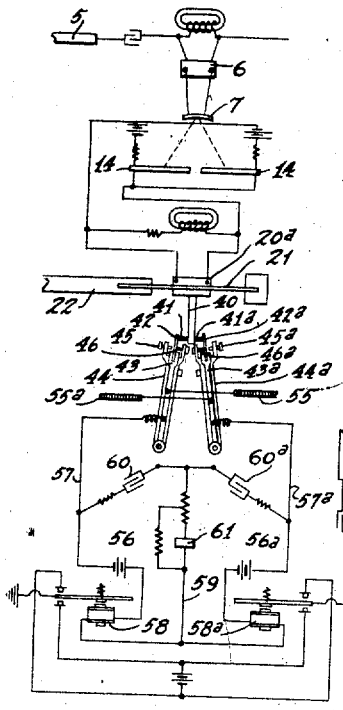
Figure 6 is a diagram illustrating means for repeating the amplified signals into another circuit.
Figure 9:
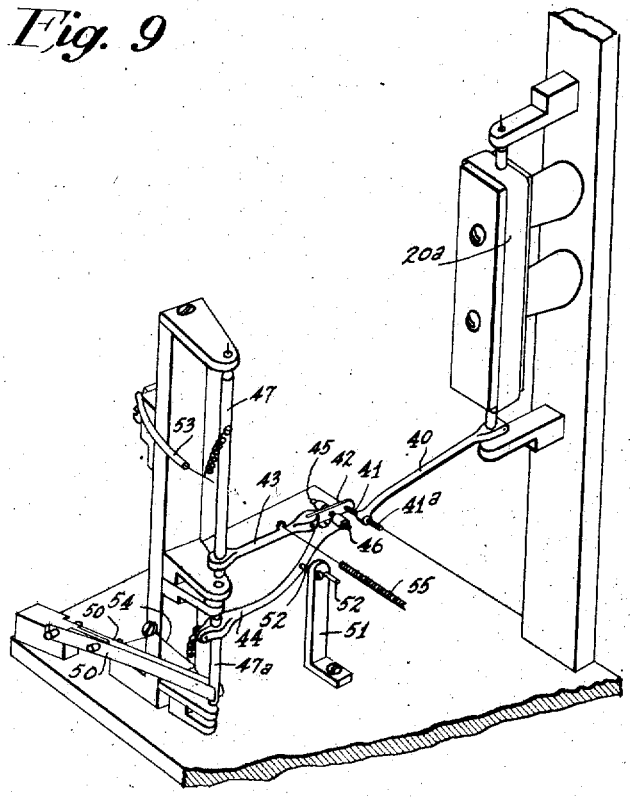
Figure 9 is a fragmentary perspective elevation of the repeating relay illustrated in Fig. 6.
Figure 10:
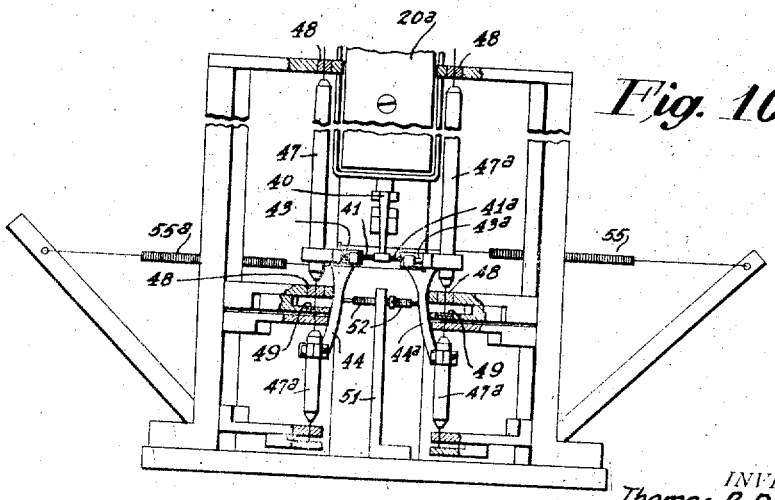
Fig. 10 shows a detail front elevation and partial section of the principal portions of the said receiving relay.

In Figure 6 I illustrate a repeating arrangement which is preferable to that indicated in Fig. 1; and in Figs. 9 and 10 I illustrate the mechanical construction of the repeating instrument indicated diagrammatically in Fig. 6. In Fig. 6, as before, numeral 7 designates the reflector operated by coil 6 (I do not show in Fig. 6, the source of the light beam reflected by this reflector 7) and numerals 14 indicate the selenium cells and numeral 20ᵃ designates the coil of the galvanometer controlled by the selenium cells. This coil, which is mounted to swing freely, carries an arm 40 provided with insulation pieces 41 and 41ᵃ adapted to engage and actuate mechanically, contact pieces 42 and 42ᵃ carried by freely swinging contact arms 43 and 43ᵃ; and beneath these arms 43 and 43ᵃ are other contact arms 44 and 44ᵃ, also mounted to swing freely, and each provided with a contact screw 45 or 45ᵃ and with an insulation stop 46 or 46ᵃ. As shown particularly in Figs. 9 and 10, the contact arms 43 and 43ᵃ are carried by delicately mounted shafts 47 having jewel bearings 48 which jewel bearings serve to insulate the contact arms 43 and 43ᵃ from the supports of such bearings; the weight of such shafts 47 and the arms 43 carried thereby, being carried by jewel step bearings 49. The contact arms 44 and 44ᵃ are carried by similar shafts 47ᵃ, for which shafts 47ᵃ, however, jewel bearings are not provided, customarily, as insulation of these arms 44 and 44ᵃ from their supports is not required, and some slight frictional retardation to motion of these arms 44 and 44ᵃ is desired, such retardation being supplied, not only by the slight friction of shafts 47ᵃ in their bearings, but also by friction springs 50. A support 51 is provided with insulation stops 52, which serve to limit the motion of contact arms 44 and 44ᵃ toward the center. Current is supplied to contact arms 43 and 43ᵃ through very flexible conductors 53, and current is similarly supplied to contact arms 44 and 44ᵃ by very flexible conductors 54.

Contact arms 43 and 43ᵃ are provided with light tension springs 55 and 55ᵃ respectively, tending to hold the contact piece, 42 or 42ᵃ, of that arm, 43 or 43ᵃ against the insulation piece 41 or 41ᵃ of the arm 40.

For each of the contact mechanisms 43—44 etc., and 43ᵃ—44ᵃ, a separate battery, 56 or 56ᵃ, is provided, current passing from this battery through conductor 57 or 57ᵃ to arm 43 or 43ᵃ and current passing from the other side of the said battery through the magnet of a transmitting relay 58 or 58ᵃ and thence through a conductor 59 to contact arm 44 or 44ᵃ. To reduce sparking at the contact points of contact mechanisms 43—44 and 43ᵃ—44ᵃ, I provide shunted condensers 60 and 60ᵃ.

The operation of this instrument is as follows:

Supposing a current pulse in the cable circuit 5 to deflect the coil 6 to one side or the other, so changing the illumination of the selenium cells 14, the coil 20ᵃ will be deflected to one side or the other, according to the direction of such current pulse in cable circuit 5. We will assume that the coil 20ᵃ is moved to the left in Fig. 6. Such movement causes the arm 40 of coil 20ᵃ to move the contact arm 43 to the left, the contact piece 42 of the arm 43 immediately making contact with contact piece 45 of arm 44, and so closing circuit through the magnet of repeating relay 58. The contact arm 44, being mounted to move quite freely, moves with contact arm 43 as soon as contact pieces 42 and 45 have made contact, so that the making of such contact does not limit appreciably the movement of the coil 20ᵃ; but as soon as coil 20ᵃ starts to move back, the spring 55 draws contact arm 43 away from contact piece 45, so breaking the circuit of repeating relay 58; and spring 55 then restores contact arms 43 and 44 to normal position as rapidly as the movement of coil 20ᵃ will permit. Relays 58 and 58ᵃ operate, as shown, repeating contacts, whereby the signals in cable circuit 5 are repeated into another circuit 5ᵃ.

Similarly, the movement of the arm 40 to the right of Fig. 6 will cause the operation of the contact mechanism 43ᵃ—44ᵃ, in the same manner, and the operation of transmitting relay 58ᵃ in the same manner.

It is convenient to provide the coil 20ᵃ with a siphon tube 21 adapted to write upon a moving tape 22, in order that the signals received may be recorded and that there may be a check upon the signals transmitted by relays 58 and 58ᵃ. And for a further check upon the signals transmitted by relays 58 and 58ᵃ a further recorder 61 of suitable type may be provided.

Figure 7:
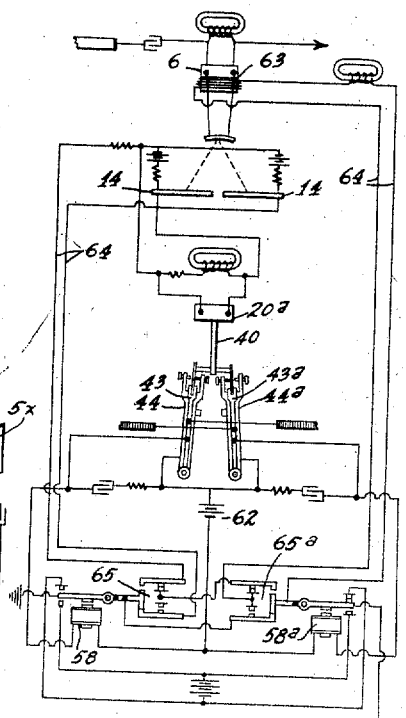
Figure 7 is a similar diagram illustrating an alternative repeating arrangement, and illustrating the use of a curbing circuit and curbing windings on the coil of the line galvanometer.

In Fig. 7 I show an arrangement of circuits and instruments similar to that of Fig. 6, except that one battery 62, is provided for the two contact mechanisms 43—44 and 43ᵃ—44ᵃ instead of a separate battery for each such contact mechanism, and except that circuits are provided whereby the change of illumination of selenium cells 14, due to a deflection of mirror 7, acts upon coil 6, first to assist the movement of such coil and render it more prompt in its movement and then to curb the movement of such coil. To this end, the coil 6 is provided with a supplemental winding 63 in a circuit 64 arranged to be reversed by pole changing contact mechanism 65 and 65ᵃ with which relays 58 and 58ᵃ are provided. Supposing coil 6 to be deflected and to vary the illumination of selenium cells 14, and thereby to cause deflection of coil 20ᵃ, current passes through circuit 64 (connected in parallel, as shown, to the circuit which operates coil 20ᵃ) through the supplemental winding 63 of coil 6, in a direction to enhance the motion of such coil 6, thereby, making the motion of coil 6 more prompt and rapid; but as soon as one of the relays 58 or 58ᵃ has been operated, through the operation of coil 20ᵃ, the current through such supplemental winding 63 is reversed, whereby the deflection of coil 6 is checked; such current through 63 being insufficient, however, to cause return movement of coil 6 during the period of a normal signal.

Figure 11:
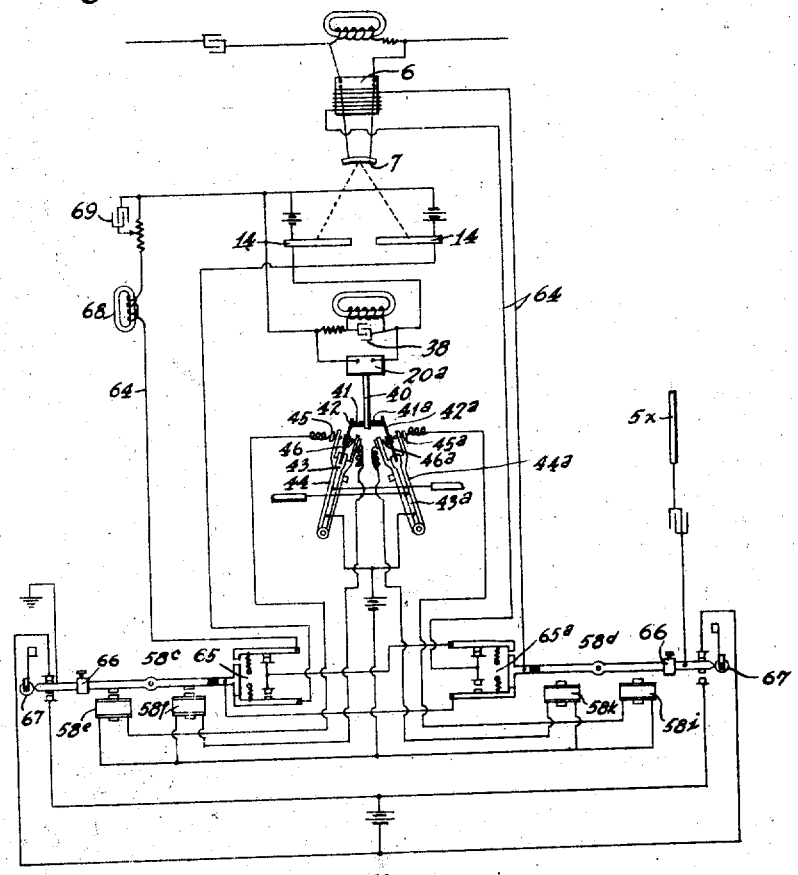
Figure 11 is a diagram illustrating a further alternative repeating arrangement.

In Fig. 11 I illustrate a further and preferred repeating arrangement, very similar to that shown in Fig. 7, except that the two repeating relays, here designated by numerals $58^c$ and $58^d$ are provided each with two separate magnets $58^e$ and $58^f$ for relays $58^c$ and $58^l$ and $58^k$ for relay $58^d$; and except that the armatures of relays $58^c$ and $58^d$ are provided with adjustable weights 66 whereby the normal rate of movement of said armatures may be varied; and except that a spring actuated jockey 67 is provided for each relay, such jockey bearing against the V-shaped end of the armature of the relay. The contact points 45 and 46 and $45^a$ and $46^a$ of the repeater are, furthermore, insulated from each other and are in separate circuits, contacts 45 and $45^a$ controlling magnets $58^e$ and $58^l$ respectively, and contacts 46 and $46^a$ controlling respectively, magnets $58^f$ and $58^k$. It will be apparent that when contact arm 40 is deflected toward the left, magnet $58^e$ will be energized and will actuate the armature of relay $58^c$, such armature, when so actuated, being held in the position to which it has been moved, by the jockey 67, until magnet $58^f$ is energized, and positively moves such armature back against the resistance offered by jockey 67; and energization of magnet $58^f$ will occur only when the coil $20^a$ is well back on its return swing toward the central position.

Similarly, if coil $20^a$ be deflected toward the right magnet $58^l$ will be energized and will operate the armature of relay $58^d$, which armature will be held in its resulting position, by the jockey 67, until well after the return swing of the coil $20^a$ toward its central position, during which return swing magnet $58^k$ will be energized and will restore the armature of relay $58^d$ to normal position. The use of separate magnets for moving the armatures in these relays $58^c$ and $58^d$ from and toward normal positions with separate contacts operated by arm 40 of coil $20^a$ for actuating the magnet and the adjustable weights 66 on the armatures of the relays and jockeys 67 acting against said armature, provide a very wide range of adjustment of the extent of return swing of the coil $20^a$ which may occur before the repeating relay $58^c$ or $58^d$, is actuated as a result of such return swing. In Fig. 11 I also illustrate, in the curbing circuit 64 of coil 6, inductive resistance 68 and a shunted condenser 69 whereby such curbing circuit may be tuned or timed as to its curbing action upon coil 6.

Figure 12:
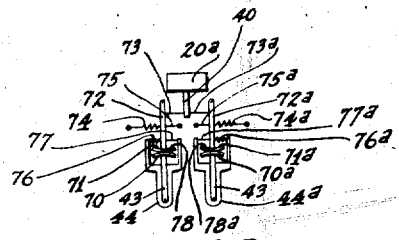
Figure 12 shows, more or less diagrammatically, an alternative arrangement of contacts which may be employed, and is particularly adapted for use in a repeating instrument such as illustrated in Figs. 9 and 10, and illustrated diagrammatically in Figs. 6, 7 and 11.

In Fig. 12 I illustrate diagrammatically alternative contact mechanism which may be substituted for the mechanism 40 to 46 and 40 to $46^a$ illustrated in Figs. 9 and 10 and illustrated diagrammatically in Figs. 6, 7 and 11. In this alternative arrangement, the arms 43 and $43^a$ are provided with contact segments 70 and $70^a$ respectively, coacting with other contact segments 71 and $71^a$ of delicately pivoted levers 72 and $72^a$, which levers are connected by fibers 73 and $73^a$, to the arm 40 of coil $20^a$ and are provided with retractile springs 74 and $74^a$ and with suitable stop fibers 75 and $75^a$; and these levers 72 and $72^a$ are further connected by fibers 76, 77, $76^a$ and $77^a$, to the arms 44 and $44^a$; there being slight slack in the fibers 76, 77 and $76^a$ and $77^a$, when the levers 73 and $73^a$ are in middle position with reference to arms 44 and $44^a$. Each contact segment 71 and $71^a$ is provided over a portion of its face with insulation 78 and $78^a$ respectively. It will be apparent that circuit will be completed when, by the motion of arm 40 the conducting portion of one of the segments 71 or $71^a$ is brought into contact with the segment 70 or $70^a$.

Contact points, such as 42, 45, 46, $42^a$, $45^a$, and $46^a$, illustrated in Figs. 6, 7, 9 and 10, are likely to stick very slightly, when they should break circuit promptly; such sticking being due to adhesion, and other reasons. Similar sticking does not occur, at least to the same extent, between contact segments, such as 70 and 71, which roll upon one another; for which reason an instrument provided with contacts such as illustrated in Fig. 12 will be more sensitive, other things being equal, than an instrument provided with contact points such as shown in Figs. 9 and 10.

I use the term "signal-translating means" in certain of the following claims, to include any means for reproducing signals, either visually (as by marking the signals on a tape or other record sheet) or by movements of a beam of light, or audibly (as by operating a suitable sounder) or by repeating the signals into another circuit.

I use the term "illumine" and like terms, with reference to the action of radiant energy (a light beam, for example) on radio-electro-sensitive means (selenium cells, for example) as inclusive of action of radiant energy of all classes on radio-electro-sensitive means of all types.

By the method of and means for amplifying cable signals herein illustrated and described, I have been able to attain a speed of transmission of three hundred and seventy letters per minute over a cable about eight hundred miles in length and having an ohmic resistance of eight thousand ohms and a static capacity of two hundred and sixty micro-farads, i. e., a K R factor of 2,080,000, the signals, as recorded on the tape of a siphon recorder being substantially perfect in form and entirely readable. Still higher speed of transmission has been obtained by me over this cable, when, owing to temporary conditions, the retardation was lower than as given above.

What I claim is:

1. Apparatus for receiving and amplifying telegraphic signals comprising in combination two radio-electro-sensitive elements, circuits including the same including electric generators, a third circuit to which the circuits of said radio-electro-sensitive elements are connected, the polarity of said electric generators being opposite with respect to such third circuit, an actuating element arranged to direct a beam of radiant energy upon both said radio-electro-sensitive elements, and by its operation to vary the illumination of such radio-electro-sensitive elements in opposite senses respectively, said beam normally illuminating substantial portions of both said radio-electro-sensitive elements, and a controlled element controlled by the said third circuit.

2. Apparatus for receiving and amplifying telegraphic signals comprising two radio-electro-sensitive elements, circuits including the same, electric generators in said circuits, a third circuit to which the circuits of said radio-electro-sensitive elements are connected, the polarities of said generators being opposite with respect to said third circuit, an actuating element arranged to deflect variably a beam of radiant energy across the surfaces of such radio-electro-sensitive elements, the said beam when in mid-position covering a considerable portion of both said radio-electro-sensitive elements, and a controlled element controlled by the said third circuit.

3. Apparatus for receiving and amplifying telegraphic signals comprising two radio-electro-sensitive elements, a separate circuit for each such element, a third circuit to which the circuits of said radio-electro-sensitive elements are connected in opposition, a galvanometer comprising a reflector arranged to deflect a beam of radiant energy variably across said radio-electro-sensitive elements, such beam when in mid-position covering a considerable portion of both said radio-electro-sensitive elements, and a controlled element controlled by said third circuit.

4. Apparatus for receiving and amplifying telegraphic signals comprising two radio-electro-sensitive elements, a separate circuit for each such element, a third circuit to which the circuits of said radio-electro-sensitive elements are connected in opposition, a galvonometer comprising a reflector arranged to deflect a beam of radiant energy variably across said radio-electro-sensitive elements, such beam when in mid-position covering a considerable portion of both said radio-electro-sensitive elements, and a second galvonometer controlled by said third circuit and comprising signal-translating means operated by the operation of said second galvanometer.

5. Apparatus for receiving and amplifying telegraphic signals comprising in combination a radio-electro-sensitive element, a conductor mounted to oscillate, means producing a magnetic field influencing such conductor, a reflector oscillated by movement of said conductor and arranged to reflect variably a beam of radiant energy across the surface of such radio-electro-sensitive element, the rest position of such reflector corresponding to a condition of partial illumination of said radio-electro-sensitive element, a controlled element controlled by the circuit of said radio-electro-sensitive element, said controlled element comprising curbing windings, and a curbing circuit connected to such windings and controlling means for such circuit controlled by such controlled element.

6. In telegraphy, a selenium relay comprising associated selenium cells arranged to form two arms of a Wheatstone bridge with suitable resistances in the other arms to balance the bridge, a source of current connected across one diagonal of the bridge, and a receiving instrument and an inductive resistance in shunt one to the other connected across the other diagonal of the bridge.

7. In telegraphy, a selenium relay having an inductive shunt around the receiving instrument adjusted to compensate for the inertia of the selenium.

8. In telegraphy, a radio-electric relay comprising associated radio-electro-sensitive cells arranged to form two arms of a Wheatstone bridge with suitable resistances in the other arms to balance the bridge, a source of current connected across one diagonal of the bridge, and a receiving instrument and an inductive resistance in shunt one to the other connected across the other diagonal of the bridge.

9. Apparatus for receiving and amplifying telegraphic signals comprising in combination two associated radio-electro-sensitive elements, a controlled device, a main circuit including that controlled device, two branch circuits connected to said main circuit, one such branch circuit containing one such radio-electro-sensitive element, the other branch circuit containing the other radio-electro-sensitive element and batteries included one in one branch circuit and the other in the other branch circuit, the said batteries so arranged that the potential of the one battery opposes the potential of the other battery as to said main circuit, and signal controlled means responsive to a telegraphic code of signals composed of electrical impulses of the same and reversed polarity and adapted to vary the degree of illumination of said radio-electro-sensitive elements.

10. Apparatus for receiving and amplifying telegraphic signals comprising in combination a Wheatstone bridge, radio-electro-sensitive elements in the four arms of said bridge, a controlled device in the cross wire of the bridge, and a source of current supply connected to the two ends of the bridge, the said radio-electro-sensitive elements being arranged in pairs and the pairs being associated in such manner that increase or decrease of illumination of the radio-electro-sensitive devices of such pairs affects such devices of each pair similarly, and that increase of illumination of one pair and corresponding decrease of illumination of the other pair affect the controlled element similarly.

11. In telegraphy, a radio-electric relay comprising one or more radio-electro-sensitive elements and a receiving instrument controlled thereby, and an inductive shunt around the receiving instrument adjusted to compensate for the inertia of the radio-electro-sensitive element or elements.

12. In telegraphic apparatus of the kind referred to, the combination of a plurality of selenium cells arranged in separate branch circuits each connected with a generator, a receiving instrument also connected to said cells, means for projecting a broad beam of light upon such cells and for moving such beam over the surfaces of such cells in such manner, that as the illumination of one cell is decreased the illumination of another cell is increased, the connections being such that the potentials of the batteries of said selenium cells are normally opposed one to the other and balance each other when the illumination of the cells is approximately equal, and that increase of illumination of one cell and decrease of illumination of the opposing cell cooperate to produce operation of the said receiving instrument, and signal controlled means responsive to a telegraphic code of signals composed of electrical impulses of the same and reversed polarity and adapted to vary the degree of illumination of said cells.

13. In telegraphic apparatus of the kind referred to, a Wheatstone bridge and selenium cells in the arms of such bridge, in combination with a generator connected to the ends of such bridge and a receiving instrument contained in the cross wire of the bridge, and inductive resistance also in said cross wire and in shunt with respect to said receiving instrument.

14. The herein described method of transmitting, receiving and amplifying telegraphic signals, which consists in transmitting signals through an electric circuit by currents of one polarity for one class of signals of the telegraphic code, and by currents of the opposite polarity for another class of signals of the telegraphic code, causing the signals so transmitted to vary the degree of illumination of cooperating radio-electro-sensitive elements in electric circuits electrically so connected with the receiving instrument that increase of illumination of one such element and decrease of illumination of the other element have a cumulative effect in reproducing and amplifying signals of the same polarity, said cooperating radio-electro-sensitive elements being each illumined to an intermediate and substantial degree when no signals are being transmitted, signals of one polarity causing decrease of illumination of one element and increase of illumination of its cooperating element, and signals of the opposite polarity causing increase of illumination of the element first referred to and decrease of illumination of its cooperating element, and causing the resulting current fluctuations in the circuits of said cooperating radio-electro-sensitive elements to operate electrical signalling means.

15. The herein described method of receiving and amplifying telegraphic signals, which consists in receiving signals transmitted through an electric circuit by currents of one polarity for one class of signals of the telegraphic code, and by currents of the opposite polarity for another class of signals of the telegraphic code, causing the signals to vary the degree of illumination of cooperating radio-electro-sensitive elements in electric circuits so connected electrically with the receiving instrument that increase of illumination of one such element and decrease of illumination of the other element have a cumulative effect in reproducing and amplifying signals of the same polarity, said cooperating elements being each illumined to an intermediate and substantial degree when no signals are being transmitted, signals of one polarity causing decrease of illumination of one element and increase of illumination of its cooperating element, and signals of the opposite polarity causing increase of illumination of the element first referred to and decrease of illumination of its cooperating element, and causing the resulting current fluctuations in the circuits of said cooperating radio-electro-sensitive elements to operate electrical signaling means.

16. In telegraphy, a selenium signal amplifying apparatus embodying a primary receiving instrument and a secondary receiving instrument, an inductive shunt connected around the primary receiving instrument, and an inductive shunt connected around the secondary receiving instrument.

17. In telegraphy, a selenium signal amplifying apparatus embodying a primary receiving instrument, a secondary receiving instrument, and an inductive shunt connected around one of said instruments.

18. In telegraphy, a selenium signal amplifying apparatus embodying a primary receiving instrument, a secondary receiving instrument and an inductive shunt connected around the primary receiving instrument.

19. In a telegraphy, a selenium signal amplifying apparatus embodying a primary receiving instrument, a secondary receiving instrument, and an inductive shunt connected around the secondary receiving instrument.

20. In telegraphy, a selenium signal amplifying apparatus embodying a primary receiving instrument, a secondary receiving instrument, an inductive shunt connected around one of said instruments and a non-inductive resistance in series with said inductive shunt.

21. In telegraphy, a selenium signal amplifying apparatus embodying a primary receiving instrument, a secondary receiving instrument, an inductive shunt connected around one of said instruments and an adjustable non-inductive resistance in series with said inductive shunt.

22. In telegraphy, a radio-electro signal amplifying apparatus embodying a primary receiving instrument and a secondary receiving instrument, an inductive shunt connected around the primary receiving instrument and an inductive shunt connected around the secondary receiving instrument.

23. In telegraphy, a radio-electro signal amplifying apparatus embodying a primary receiving instrument, a secondary receiving instrument, an inductive shunt, and a non-inductive resistance in series therewith connected around the primary receiving instrument, and an inductive shunt and a non-inductive resistance in series therewith connected around the secondary receiving instrument.

24. An apparatus for receiving and amplifying telegraphic signals comprising, in combination, a radio-electro-sensitive device normally partially illuminated, a controlled element, a circuit connecting said controlled element and radio-electro-sensitive device and including a battery, another circuit also including the radio-electro-sensitive element and battery and containing a battery arranged to oppose with its potential the potential of the first mentioned battery with reference to the controlled element, and also including resistance to balance the resistance of the radio-electro-sensitive device, and signal controlled means responsive to a telegraphic code composed of electrical impulses of the same and reversed polarity and adapted to vary the degree of illumination of the radio-electro-sensitive device.

25. An apparatus for receiving and amplifying telegraphic signals comprising, in combination, a radio-electro-sensitive device normally partially illuminated, a controlled element, a circuit connecting said controlled element and radio-electro-sensitive device and including a battery, another circuit also including the radio-electro-sensitive element and battery and containing a battery arranged to oppose with its potential the potential of the first mentioned battery with reference to the controlled element, and also including resistance to balance the resistance of the radio-electro-sensitive device, signal controlled means adapted to vary the degree of illumination of the radio-electro-sensitive device, and an inductive shunt connected around the controlled element.

26. In telegraphic apparatus of the kind referred to, a receiving instrument, and two branch circuits connected thereto one such branch circuit containing a normally partially illuminated selenium cell and a generator, the other branch circuit containing a generator opposing the first mentioned generator, and also including resistance to normally balance the resistance of the selenium cell, and signal controlled means responsive to a telegraphic code composed of electrical impulses of the same and reversed polarity and adapted to vary the degree of illumination of said cell.

27. In telegraphic apparatus of the kind referred to, a receiving instrument, and two branch circuits connected thereto, one such branch circuit containing a normally partially illuminated selenium cell and a generator, the other branch circuit containing a generator opposing the first mentioned generator, and also including resistance to normally balance the resistance of the selenium cell, and an inductive shunt connected around the receiving instrument.

28. In telegraphy, a receiving instrument, a circuit including a source of electrical energy for controlling the operation of the receiving instrument, radio-electro-sensitive means included in said circuit, means for projecting a broad beam of light upon the radio-electro-sensitive means for normally illuminating a substantial portion thereof, to normally maintain the radio-electro-sensitive means at a proper working resistance, and means associated with said circuit for normally balancing the effect of the current of said circuit on the receiving instrument, and an inductive shunt around the receiving instrument.

29. An apparatus for receiving and amplifying telegraphic signals comprising, in combination, a selenium cell, a cable circuit normally deenergized, a pencil of light normally illuminating a substantial portion of the cell, a galvanometer controlled by the cable circuit and embodying a reflector arranged to be oscillated through the operation of the galvanometer and adapted to reflect said pencil of light variably across the surface of the selenium cell, the rest or zero position of said reflector, when the cable circuit is normally deenergized, corresponding to a condition of partial and substantial illumination of said cell by the light pencil, and a controlled element controlled by the circuit of the selenium cell.

30. An apparatus for receiving and amplifying telegraphic signals comprising, in combination, a selenium cell, a cable circuit normally deenergized, a pencil of light normally illuminating a substantial portion of the cell, a galvanometer controlled by the cable circuit and embodying a reflector arranged to be oscillated through the operation of the galvanometer and adapted to reflect said pencil of light variably across the surface of the selenium cell, the rest or zero position of said reflector, when the cable circuit is normally deenergized, corresponding to a condition of partial and substantial illumination of said cell by the light pencil, a controlled element controlled by the circuit of the selenium cell, the movements of the pencil of light to one side of the zero position causing the controlled element to indicate dots, while movements of said light pencil to the other side of the zero position cause said controlled element to indicate dashes of a telegraphic code.

31. In telegraphy, a light-sensitive-signal amplifying apparatus embodying a primary receiving instrument, a secondary receiving instrument, and an inductive shunt around one of said instruments.

32. In telegraphy, a radio-electro-signal amplifying apparatus embodying a primary receiving instrument responsive to a code of telegraphic signals composed of electrical impulses of the same and reversed polarity, a secondary receiving instrument responsive to a code of telegraphic signals composed of electrical impulses of the same and reversed polarity, and an inductive shunt connected around one of said instruments.

In testimony whereof, I have signed this specification.

THOMAS BULLITT DIXON.